(12) United States Patent
Sawai (10) Patent No.: US 7,587,535 B2
(45) Date of Patent: Sep. 8, 2009

(54) DATA TRANSFER CONTROL DEVICE INCLUDING ENDIAN CONVERSION CIRCUIT WITH DATA REALIGNMENT

(75) Inventor: Takatsugu Sawai, Osaka (JP)

(73) Assignee: Panasonic Corporation, Osaka (JP)

( * ) Notice: Subject to any disclaimer, the term of this patent is extended or adjusted under 35 U.S.C. 154(b) by 43 days.

(21) Appl. No.: 11/785,798

(22) Filed: Apr. 20, 2007

(65) Prior Publication Data

US 2008/0028197 A1 Jan. 31, 2008

(30) Foreign Application Priority Data

Jul. 31, 2006 (JP) ............................. 2006-207745

(51) Int. Cl.
- G06F 3/00 (2006.01)
- G06F 13/00 (2006.01)
- G06F 13/12 (2006.01)
- G06F 12/06 (2006.01)
- G06F 9/26 (2006.01)
- G06F 9/30 (2006.01)
- G06F 7/00 (2006.01)

(52) U.S. Cl. .................. 710/62; 710/3; 710/4; 710/35; 710/66; 711/2; 711/201; 712/204; 712/210; 712/300

(58) Field of Classification Search .............. 710/62, 710/3, 4, 35, 66; 711/2, 201; 712/204, 210, 712/300
See application file for complete search history.

(56) References Cited

U.S. PATENT DOCUMENTS

| 5,550,987 | A | 8/1996 | Tanaka |
| 5,634,013 | A | 5/1997 | Childers et al. |
| 2004/0061704 | A1* | 4/2004 | Ju et al. ..................... 345/564 |
| 2004/0230765 | A1 | 11/2004 | Funahashi et al. |
| 2007/0217518 | A1* | 9/2007 | Valmiki et al. ......... 375/240.24 |

* cited by examiner

*Primary Examiner*—Niketa I Patel
(74) *Attorney, Agent, or Firm*—McDermott Will & Emery LLP (57) ABSTRACT

When data is transferred to an access destination in a different endian format, a transfer start address is aligned based on a transfer bus width, and a transfer size is adjusted according to the transfer bus width and a transfer address. Thus, it becomes possible to perform burst transfer in the access destination. Accordingly, in the case where burst transfer to an access destination in a different endian format is performed with a smaller data width than a transfer bus width, an inconvenience where burst transfer can not be performed because an address is converted and data access is no longer an ascending order access can be prevented.

6 Claims, 11 Drawing Sheets

DATA TRANSFER CONTROL DEVICE INCLUDING ENDIAN CONVERSION CIRCUIT WITH DATA REALIGNMENT

BACKGROUND OF THE INVENTION

The present invention relates to data transfer between buses in a computer system. Specifically, the present invention relates to a direct memory access (DMA) transfer control device for transfer control between apparatuses having different endianness, a bus adapter for transferring data between buses, a computer system in which one or both of the DMA transfer control device and the bus adopter are incorporated, and a method for transferring data between buses.

When the basic word length in a processor or like device is multiple bytes, there are two formats for byte ordering in storing data of 2 bytes or more into a memory, i.e., so-called "big-endian" format and "little-endian" format. In a big-endian format, data is stored in a memory in an ascending order of memory addresses. In a little-endian format, data is stored in a memory in a descending order of memory addresses. Byte ordering in storing data also differs according to a data size, for example, between a 2 byte big-endian format and a 4 byte big-endian format. For example, in storing a 4 byte data, when a byte data stream in a little-endian format is (data3, data2, data1, data0), a data stream in a 4 byte big-endian format is (data0, data1, data2, data3) and a byte data stream in a 2 byte big-endian format is (data2, data3, data0, data1).

As described above, various different formats are used for byte ordering in storing data. In a system in which such various formats are used, to ensure uniformity of shared data, a mechanism for performing endian conversion for absorbing difference in endianness is needed.

In the case where access destination use different endian formats, memory access has to be performed with consideration that data ordering is different between the access destinations. As a typical method, data locations are swapped according to an endian type of a transfer destination in order to cope with this situation.

In the case where a transfer bus width and a data width are the same or a data width is larger than a transfer bus width, it is only required to convert locations of data but not to change an address to be issued. However, when a data width is smaller than a transfer bus width, not only data location conversion is required but also an address to be issued has to be changed according to an endian type of a transfer destination.

Figure 10:
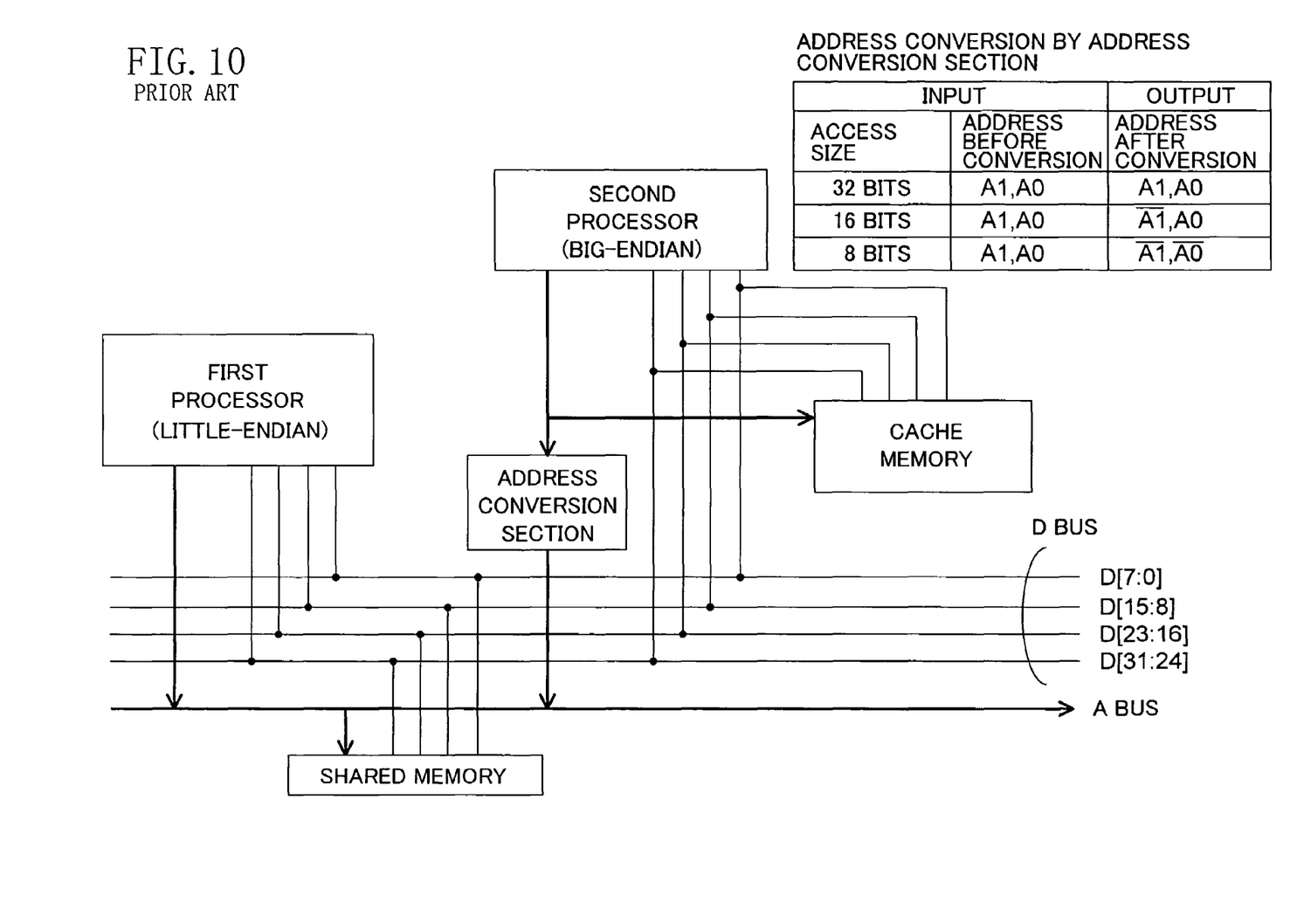
FIG. 10 is a diagram illustrating a configuration according to a known technique when transfer to an access destination in a different endian format is performed with a smaller data width than a transfer bus width.

According to a known technique, as shown in FIG. 10, when a data width is smaller than a width of a transfer bus from processors using different endian formats to a shared memory, an address conversion section for converting lower bits of an address so that the address indicates a location of the data after conversion of data location at the transfer bus width and outputting the converted address to the shared memory is provided, Thus, data access can be properly performed even when a data width is smaller than a transfer bus width (see United States Patent Application Publication No. 2004/0230765).

However, in the known technique, if burst transfer to an access destination in a different endian format is performed with a smaller data width than a transfer bus width, then the data access is no longer an ascending order access after being converted. Accordingly, burst transfer can not be performed and therefore the data transfer has to be performed by a plurality of separate single data transfers.

Figure 11:
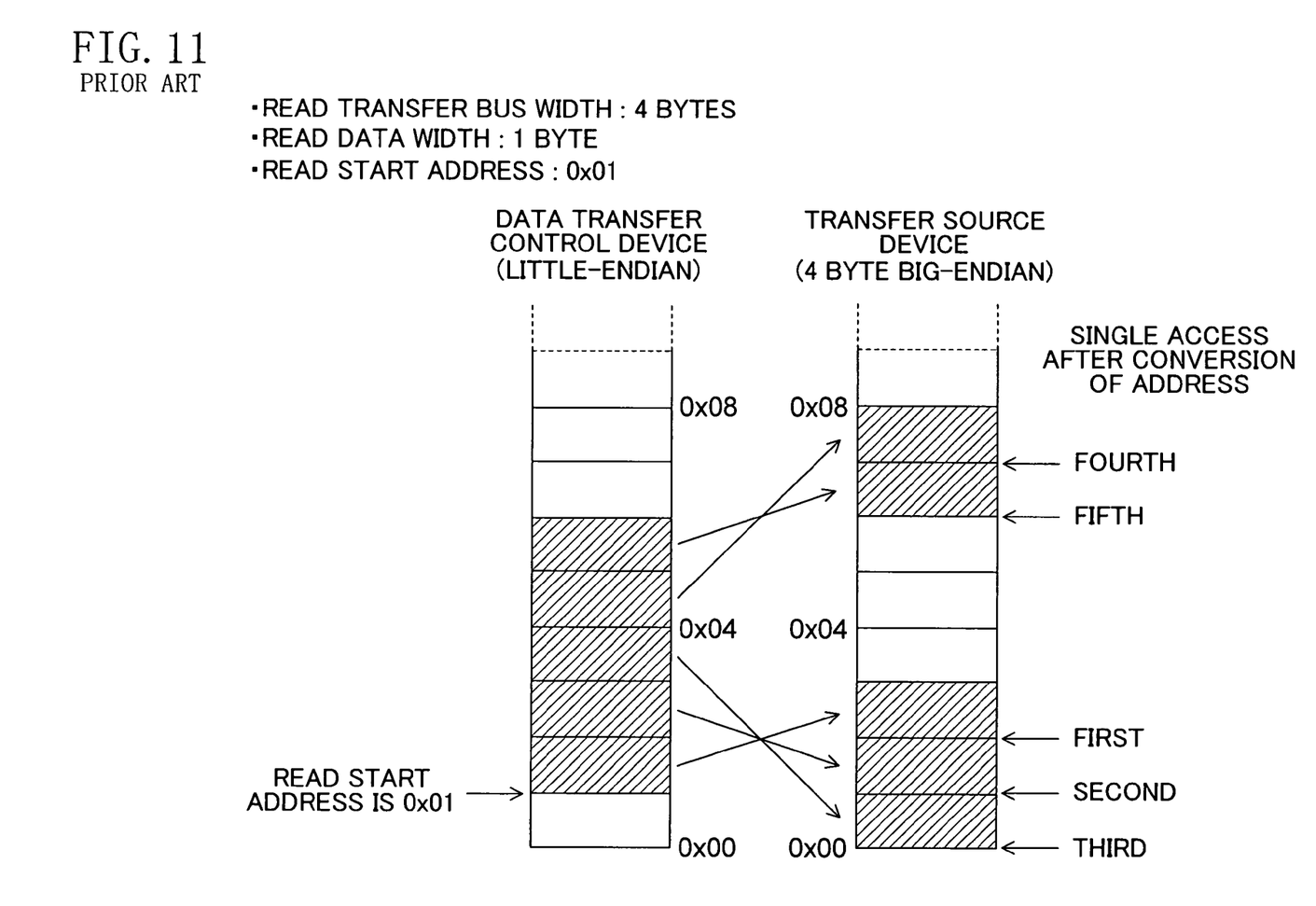
FIG. 11 is a diagram illustrating an exemplary transfer operation according to a known technique when read transfer to an access destination in a different endian format is performed with a smaller data width than a transfer bus width.

Specifically, an example where a read instruction is issued from a data transfer control device to a transfer source device in a different endian format is shown in FIG. 11. Assume that the data transfer control device is in a little endian format and the transfer source device is in a big-endian format. As for read setting, with respect to a transfer bus width of 4 bytes, a read data width is set to be a smaller value than the transfer bus width, i.e., 1 byte. Moreover, a read start address is 0x01 and a read size is 0x05. In this case, a location of data which is to be obtained from the transfer source device is changed because the transfer source device uses a different endian format from the endian format of the data transfer control device, so that the data is no longer continuous data. Therefore, the data can not be burst-transferred, the data is divided for single read transfers. In each single read transfer, address conversion is performed according to endian conversion to obtain data one by one. In the same manner, data write is performed.

Thus, in the known technique, the number of issuance of access instruction is increased and, accordingly, access performance for access to a large latency memory is degraded.

SUMMARY OF THE INVENTION

It is therefore an object of the present invention to provide a data transfer control device which allows access corresponding to an endian type of a transfer destination without degrading access performance even when burst transfer to an access destination in a different endian format is performed, as shown above, with a smaller data width than a transfer bus width.

A data transfer control device according to the present invention is characterized in that when data is transferred to a device in a different endian format, a transfer start address is aligned based on a transfer bus width.

A data transfer control device of the present invention is also characterized in that when data is transferred to a device in a different endian format, a transfer size is adjusted according to the transfer bus width and the transfer start address.

A data transfer control device according to the present invention is also characterized in that when data is transferred to a device in a different endian format, a transfer end address is aligned based on the transfer bus width.

In a data transfer control device according to the present invention, when data is burst-transferred to an access destination in a different endian format with a smaller data width than a transfer bus width, burst transfer is performed while avoiding data transfer being divided into a plurality of single transfers by address conversion. Thus, reduction in access performance can be prevented and data access corresponding to endian conversion can be performed.

A data transfer control device according to the present invention is also characterized in that the device includes a write strobe signal generation circuit for generating a write strobe signal for indicating an effective byte of write data, and write data to which the write strobe signal generated in the write strobe signal generation circuit has been added is input to the endian conversion circuit.

In a data transfer control device of the present invention, a write strobe signal is generated from a transfer start address or the like and the generated write strobe signal is added to data before endian conversion. Thus, the location of an effective byte of endian-converted write data can be determined in a simple manner.

A data transfer control device according to the present invention is also characterized in that in single transfer, adjustment of the transfer start address and adjustment of the transfer size or the transfer end address are not performed.

In the data transfer control device of the present invention, when data is single-transferred to an access destination in a different endian format with a smaller data width than a transfer bus width, single transfer being turning into burst transfer by unnecessary adjustment can be prevented, so that reduction in access performance can be prevented.

A system according to the present invention which includes an integrated circuit having any one of the above-described data transfer control devices of the present invention and an external memory device is characterized in that the external memory device is used as a transfer source or a transfer destination of the data transfer control device.

In the system of the present invention, even in the case where an external memory device such as an SDRAM or the like having a large access latency is accessed for data in a different endian format with a smaller data width than a transfer bus width, reduction in access performance can be prevented.

The present invention is described in detail by independent claims and dependent claims of the scope of the invention. However, it should be noted that combination of characteristics of the independent claims can be properly combined with characteristics of the dependent claims and the present invention is not limited to explicit description given in the scope of the invention.

DESCRIPTION OF THE PREFERRED EMBODIMENTS

Hereafter, embodiments of a data transfer control device according to the present invention is described in detail with reference to the accompanying drawings. Note that methods and configurations used in the following embodiments of the present invention are merely examples and the scope of the present invention is not limited by the embodiments.

First Embodiment

Figure 1:
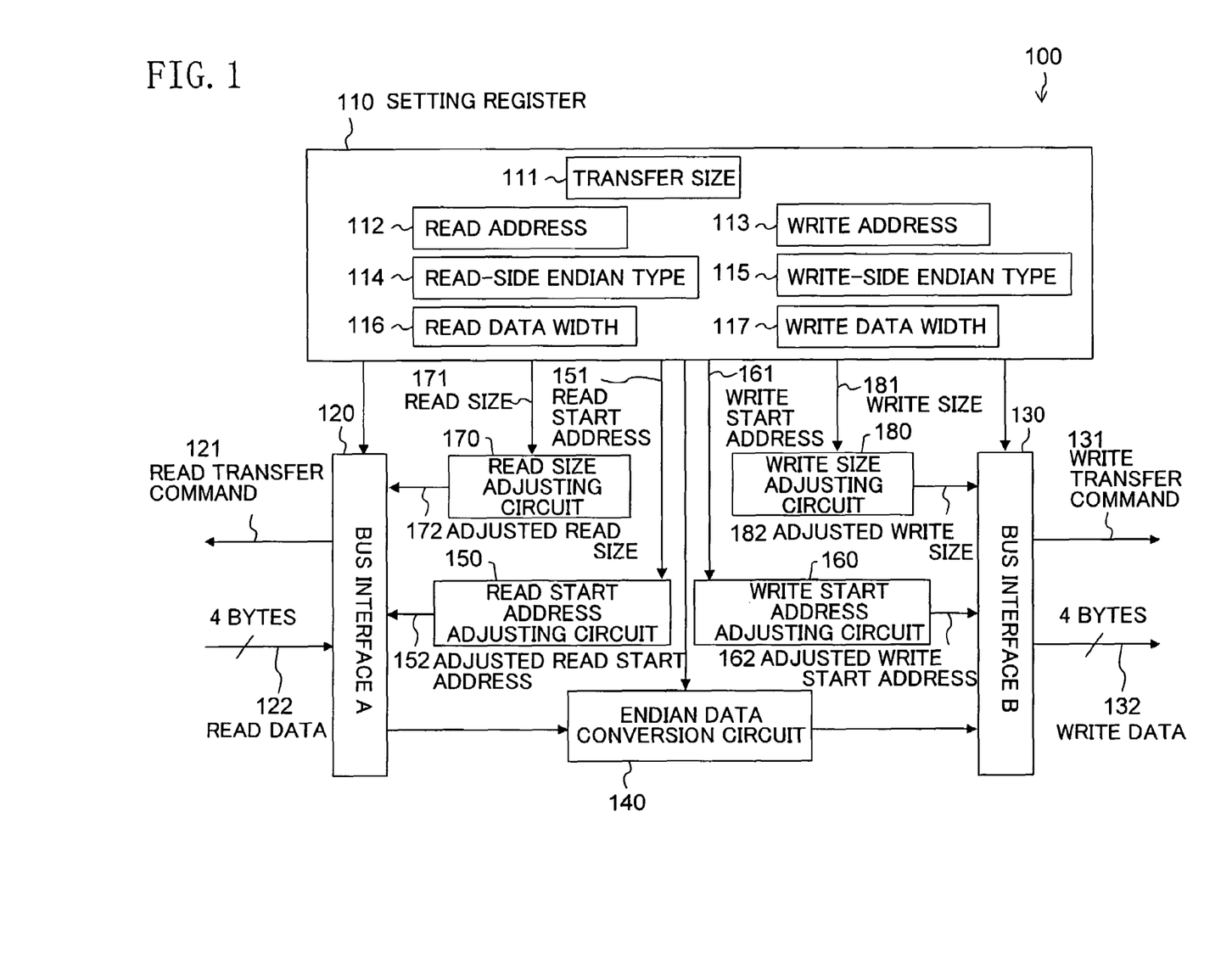
FIG. 1 is a block diagram illustrating a configuration of a data transfer control device according to a first embodiment of the present invention.

FIG. 1 is a block diagram illustrating a configuration of a data transfer control device 100 according to a first embodiment of the present invention. In the data transfer control device 100, a transfer source device or a bus to which a transfer source device is connected is connected to a bus interface A 120 and a transfer destination device or a bus to which a transfer destination device is connected is connected to a bus interface B 130. 121 denotes a read transfer command, 122 denotes read data, 131 denotes a write transfer command and 131 denotes write data. The same bus may be used for both of the above-described buses.

The data transfer control device 100 includes the bus interface A 120, an endian data conversion circuit 140 for receiving read data output from the bus interface A 120 and the bus interface B 130 for receiving data output from the endian data conversion circuit 140. The data transfer control device 100 includes a read start address adjusting circuit 150 for receiving a read start address 151 and outputting an adjusted read start address 152 and a read size adjusting circuit 170 for receiving a read size 171 and outputting an adjusted read size 172. Each output from the read start address adjusting circuit 150 and the read size adjusting circuit 170 is received by the bus interface A 120. The data transfer control device 100 also includes a write start address adjusting circuit 160 for receiving a write start address 161 and outputting an adjusted write start address 162 and a write size adjusting circuit 180 for receiving a write size 181 and outputting an adjusted write size 182. Each output from the write start address adjusting circuit 160 and the write size adjusting circuit 180 is received by the bus interface B 130. Moreover, the data transfer control device 100 includes a setting register 110, and a transfer size 111, a read address 112, a write address 113, a read-side endian type 114, a write-side endian type 115, a read data width 116 and a write data width 117 are set therein.

A setting register storing necessary information for transfer is not limited to the setting register 110, but transfer information may be given in a different manner. For example, transfer information may be received from an external terminal or the like.

Next, an operation when burst transfer is performed with a smaller data width than a transfer bus width in the case where a read-side device and a write-side device use different endian formats in the data transfer control device 100 is described using specific examples.

Figure 2:
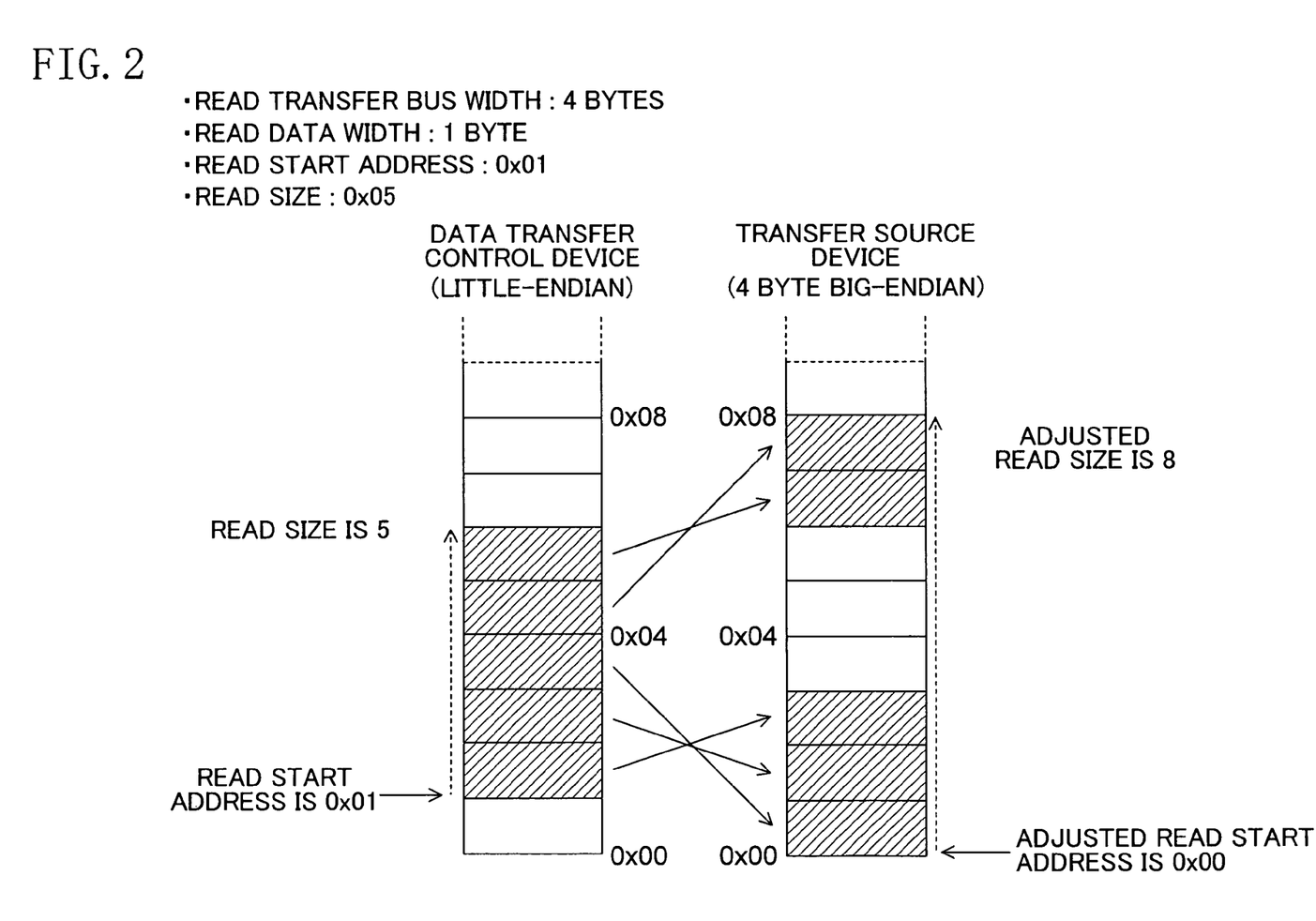
FIG. 2 is a diagram illustrating an exemplary transfer operation according to the first embodiment of the present invention when read transfer to an access destination in a different endian format is performed with a smaller data width than a transfer bus width.

In an example shown in FIG. 2, setting register, data control and the like of the data transfer control device 100 are performed in a little-endian format and a transfer source device is in a big-endian format. Moreover, a transfer bus width is 4 bytes and, in contrast, a read data width is set to be a small value, i.e., 1 byte. A read start address 151 is 0x01 and a read size 171 is 0x05. In this case, in the read start address adjusting circuit 150, the read start address 151 to be received is aligned based on the transfer bus width. Specifically, alignment is performed in the direction in which the read start address 151 is rounded down by 4 bytes and the read start address 151 is converted to 0x00. Then, 0x00 is output as an adjusted read start address 152 and is received by the bus interface A 120.

In the read size adjusting circuit 170, the read size 171 to be received is adjusted according to the transfer bus width and the read start address. First, an access amount of increase by alignment of the read start address 151 is calculated. In this case, as for an amount of access to 0x00, 1 is added and 6 is obtained. Next, alignment is performed in the direction in which 6 is rounded up by the transfer bus width, i.e., 4, and is converted into 8. Then, 8 is output as an adjusted read size 172 and is received by the bus interface A 120.

The adjusted read start address 152 and the adjusted read size 172 which have been adjusted in the above-described manner are used as a read transfer command 121 to access the transfer source device and obtain read data 122. In this example, data is obtained by performing data transfer from the address 0x00 to the address 0x07 by 8 burst transfers such that 1 byte is transferred per burst transfer. In this transfer, unnecessary read data such as data indicated by addresses 0x00, 0x06 and 0x07 in the data transfer control device are also obtained. Such data is to be ignored and not to be used for write transfer.

By adjusting a read start address and a read size in the above-described manner, even in the case where a read-side device and a write-side device use different endian formats when read burst transfer is performed with a smaller data width than a transfer bus width, data does not have to be divided for single transfers and read data can be obtained by burst transfer.

Next, in the data transfer control device 100, the operation in which write burst transfer is performed with a smaller data width than a transfer bus width when a read-side device and a write-side device use different endian formats is described.

Figure 3:
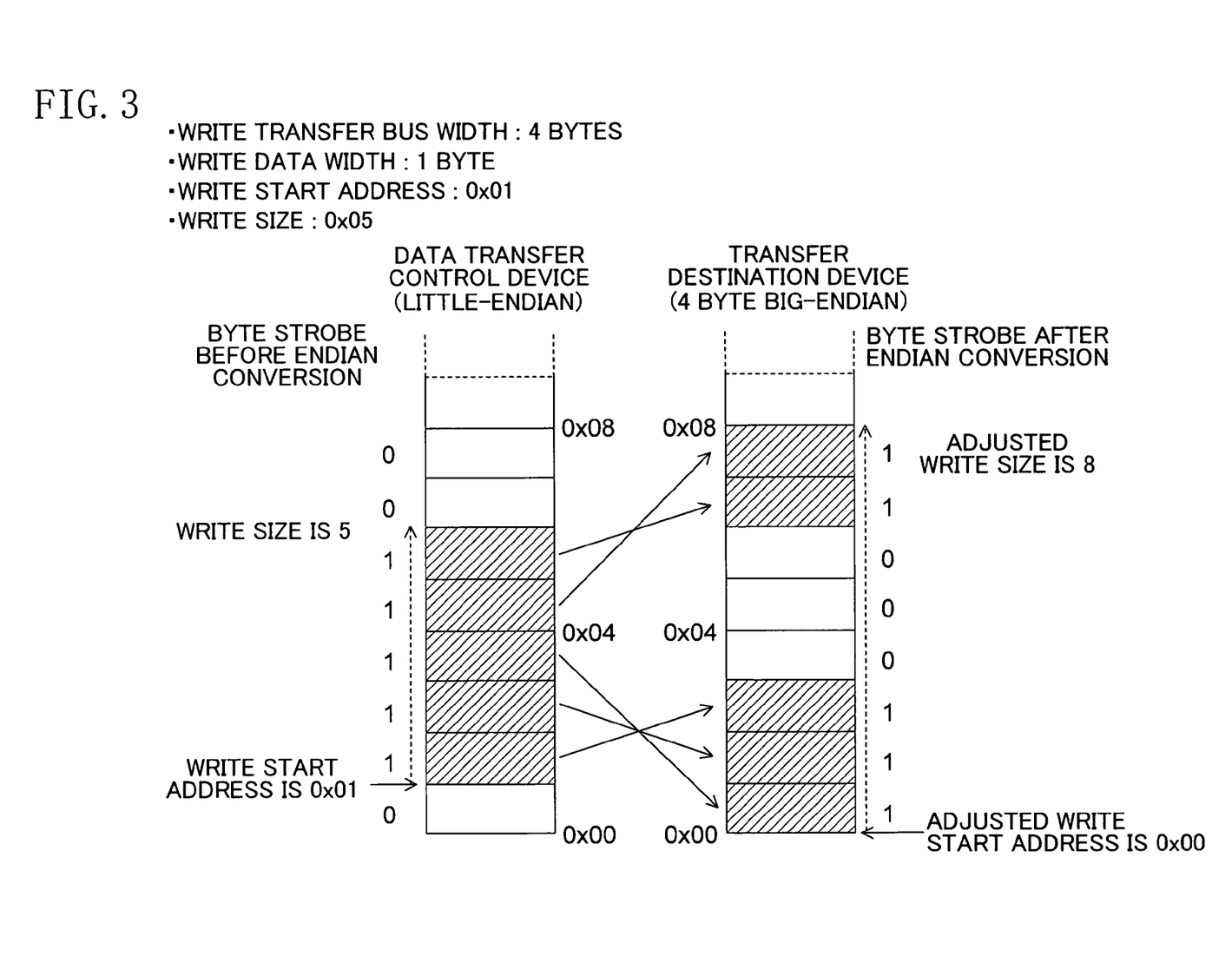
FIG. 3 is a diagram illustrating an exemplary transfer operation according to the first embodiment of the present invention when write transfer to an access destination in a different endian format is performed with a smaller data width than a transfer bus width.

In an example shown in FIG. 3, in the write start address adjusting circuit 160 and the write size adjusting circuit 180, adjustment of a write start address and a write size is performed in the same manner as in read burst and adjusted write start address and write size are output to the bus interface B 130. At the same time, an effective byte of write data can be determined from the write start address 161 and the write size 181 before adjustment and thus a byte strobe signal for this is set to be 1. In the setting of FIG. 3, the byte strobe signal is 1 at addresses from 0x01 to 0x05. Thereafter, in the endian data conversion circuit 140, endian conversion is performed to the byte strobe signal in the same manner as to the write data. The write data and the byte strobe signal output from the endian data conversion circuit 140 are output to an access destination device via the bus interface B 130. The output byte strobe signal is endian-converted, so that the byte strobe signal is 1 at addresses from 0x00 to 0x03, 0x06 and 0x07. Data is written with the byte strobe signal by 8 burst transfers from the address 0x00 to the address 0x07 such that 1 byte is transferred per burst transfer.

The write start address and the write size are adjusted in the above-described manner to generate a byte strobe signal. Thus, when write burst transfer is performed with a smaller data width than a transfer bus width, even in the case where the read-side device and the write-side device use different endian formats, data does not have to be divided for single transfers and write data can be written by burst transfer.

Figure 4:
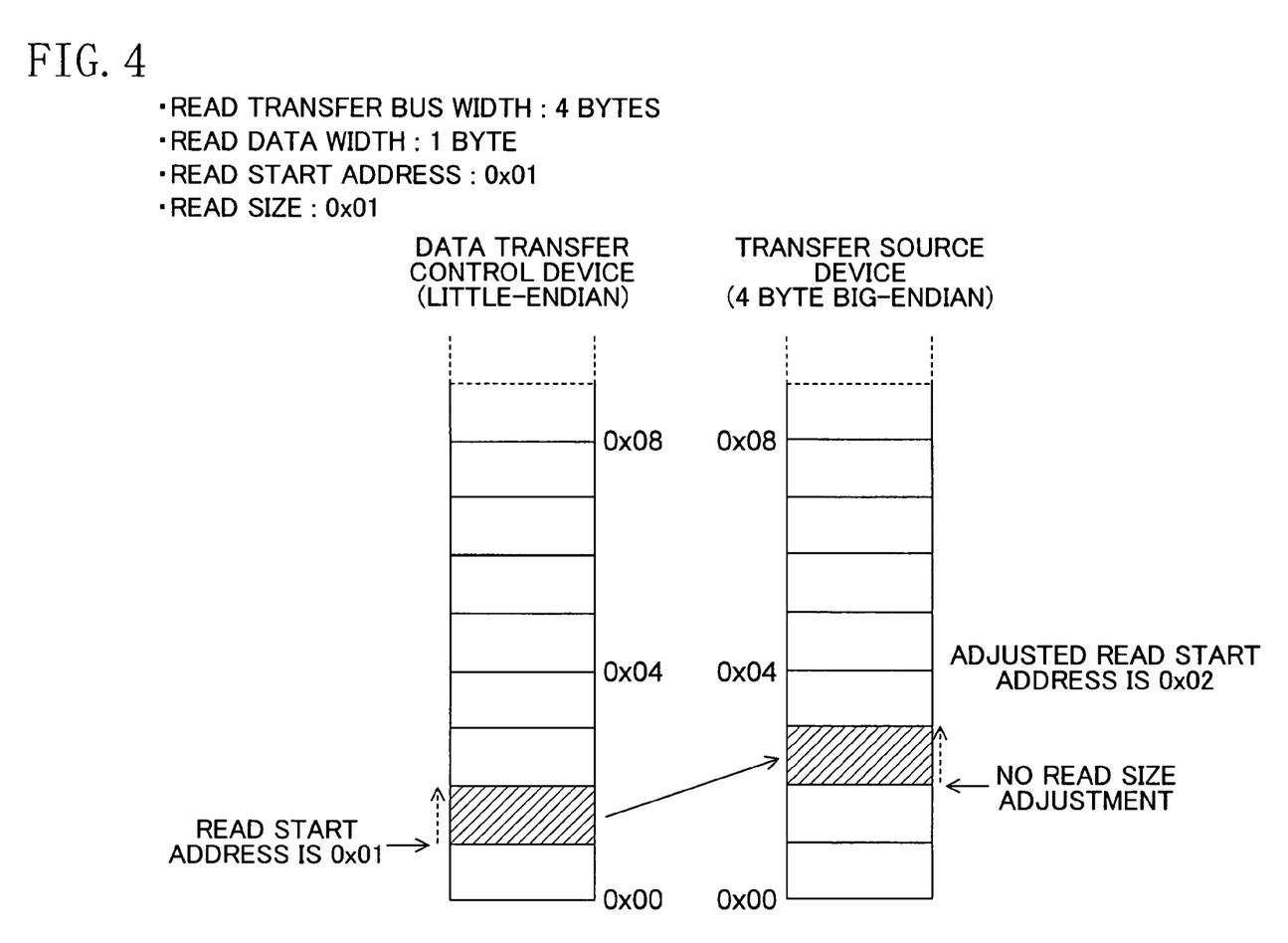
FIG. 4 is a diagram illustrating an exemplary transfer operation according to the first embodiment of the present invention when single transfer to an access destination in a different endian format is performed with a smaller data width than a transfer bus width.

Moreover, in the data transfer control device 100, when single transfer is set according to a transfer size, even with a smaller transfer data width than a transfer bus width, the above-described adjustment for start address and size is not performed. If adjustment is performed, only the number of accesses to redundant data is increased and access performance is further reduced. In such a case, conversion to an address corresponding to endianness is performed in the known manner. A specific example is shown in FIG. 4. When 0x01 is received as the read start address 151 by the read start address adjusting circuit 150, the read start address 151 is converted to an address 0x02, which is an endian-converted address. The endian-converted address is output as the adjusted read start address 152 and is received by the bus interface A 120. In the read size adjusting circuit 170, the read size is not changed. This is the same in a write transfer operation.

It has been described that as a unit for alignment of a transfer start address and a transfer end address, a transfer bus width is used. However, the alignment unit is not limited to a transfer bus width. For example, when a transfer bus width and a data unit for endian conversion are different and, specifically, the transfer bus width is 8 bytes and the data unit is 4 bytes, alignment can be performed in a unit of 4 bytes.

In the operation examples according to this embodiment, setting for a transfer register in the data transfer control device is performed in a little-endian format. However, transfer register setting is not limited to a little-endian format, but a transfer register can be set in a big-endian format or some other endian format.

Second Embodiment

Figure 5:
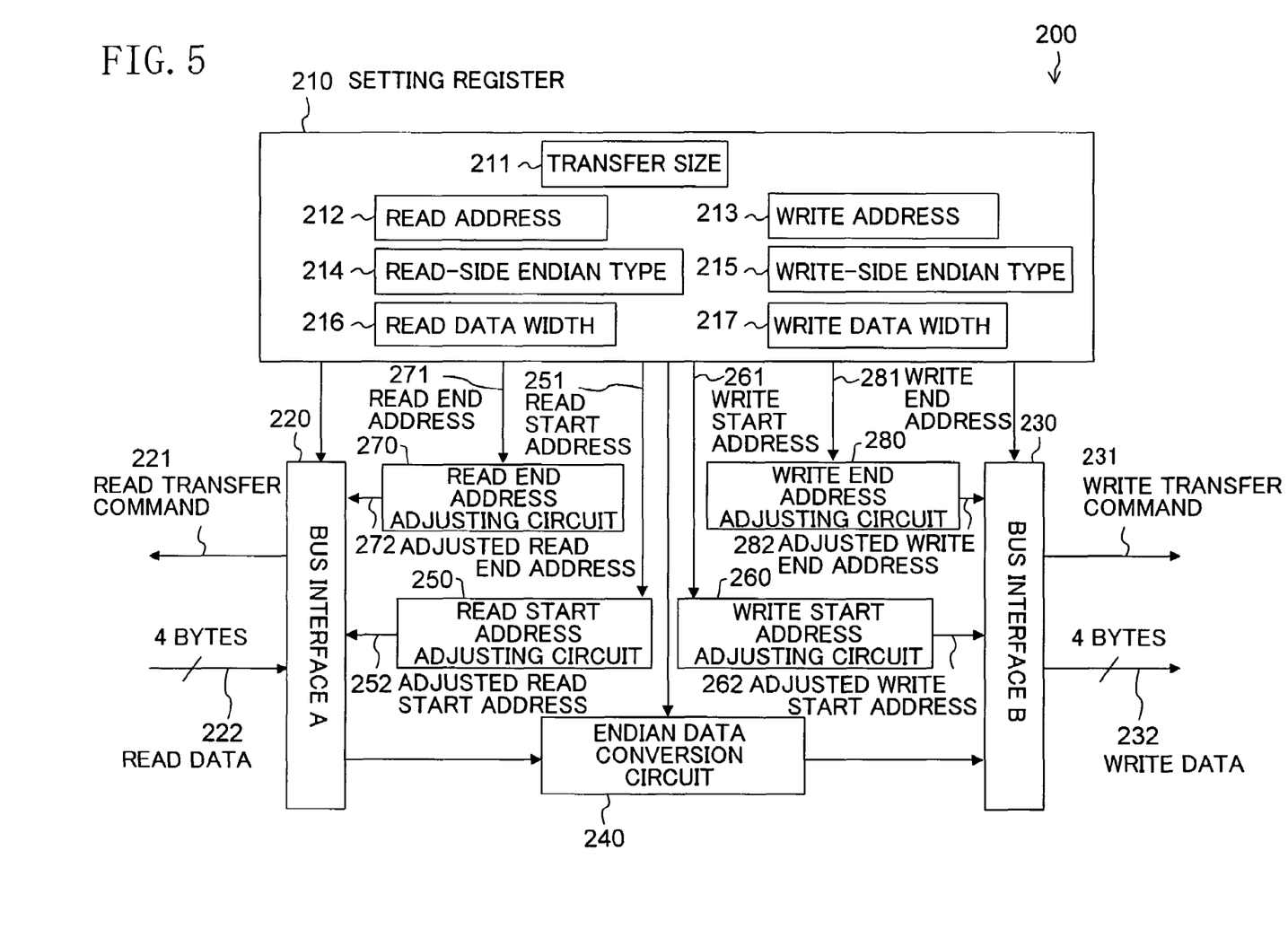
FIG. 5 is a block diagram illustrating a configuration of a data transfer control device according to a second embodiment of the present invention.

FIG. 5 is a block diagram illustrating a configuration of a data transfer control device 200 according to a second embodiment of the present invention. In the data transfer control device 200 of this embodiment, a transfer source device or a bus to which a transfer source device is connected is connected to a bus interface A220 and a transfer destination device or a bus to which a transfer destination device is connected is connected to a bus interface B230. 221 denotes a read transfer command, 222 denotes read data, 231 denotes a write transfer command and 231 denotes write data. The same bus may be used for both of the above-described buses.

The data transfer control device 200 includes the bus interface A220, an endian data conversion circuit 240 for receiving read data output from the bus interface A220 and the bus interface B230 for receiving data output from the endian data conversion circuit 240. The data transfer control device 200 includes a read start address adjusting circuit 250 for receiving a read start address 251 and outputting an adjusted read start address 252 and a read end address adjusting circuit 270 for receiving a read end address 271 and outputting an adjusted read end address 272. Each output from the read start address adjusting circuit 250 and the read end address adjusting circuit 270 is received by the bus interface A220. The data transfer control device 200 also includes a write start address adjusting circuit 260 for receiving a write start address 261 and outputting an adjusted write start address 262 and a write end address adjusting circuit 280 for receiving a write end address 281 and outputting an adjusted write end address 282. Each output from the write start address adjusting circuit 260 and the write end address adjusting circuit 280 is received by the bus interface B230. Moreover, the data transfer control device 200 includes a setting register 210, and a transfer size 211, a read address 212, a write address 213, a read-side endian type 214, a write-side endian type 215, a read data width 216 and a write data width 217 are set therein.

A setting register storing necessary information for transfer is not limited to the setting register 210. Transfer information may be given in a different manner. For example, transfer information may be received from an external terminal or the like.

Next, an operation when burst transfer is performed with a smaller data width than a transfer bus width in the case where a read-side device and a write-side device use different endian formats in the data transfer control device 200 is described using specific examples.

Figure 6:
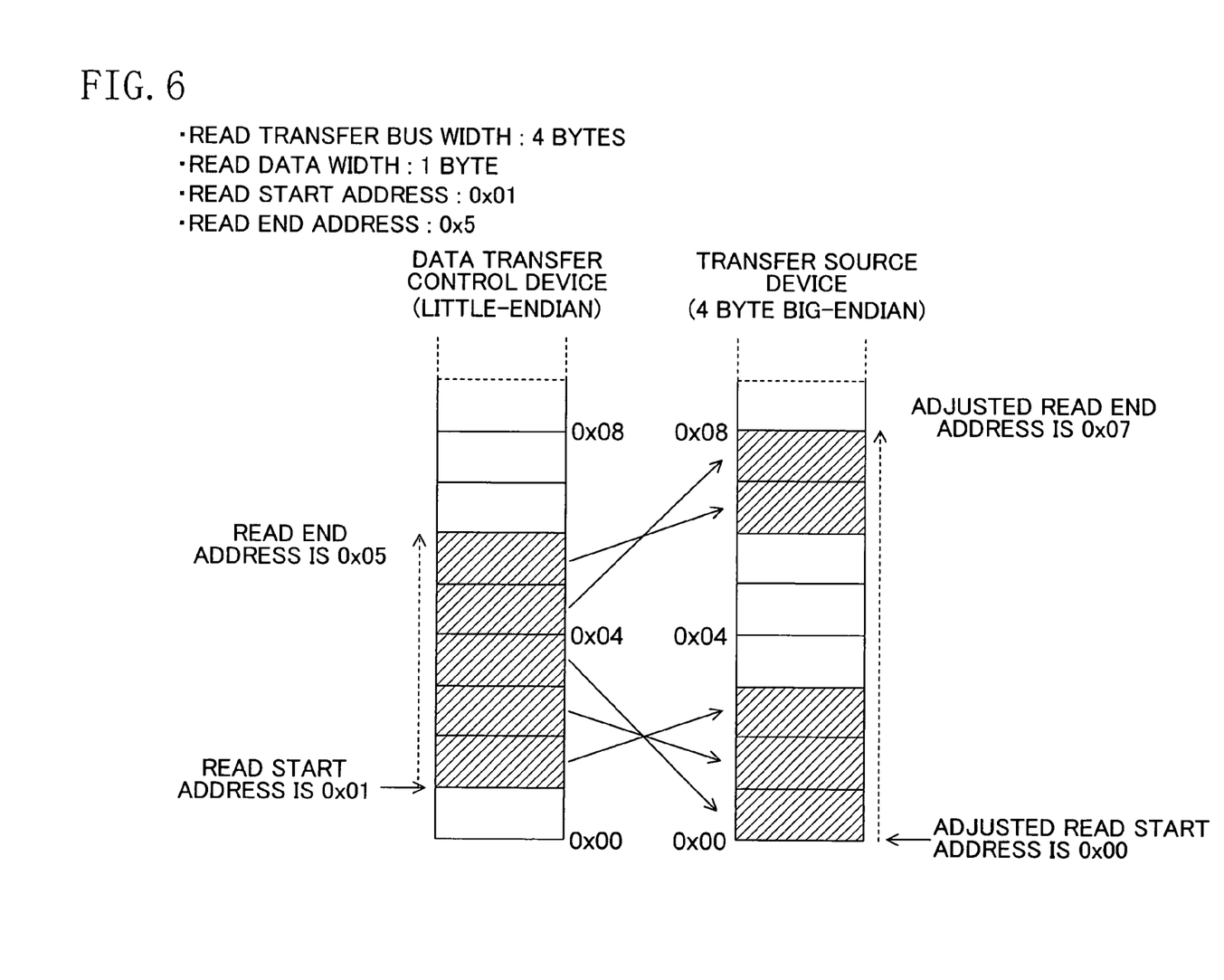
FIG. 6 is a diagram illustrating an exemplary transfer operation according to the second embodiment of the present invention when read transfer to an access destination in a different endian format is performed with a smaller data width than a transfer bus width.

In an example shown in FIG. 6, setting register, data control and the like of the data transfer control device 200 are performed in a little-endian format and a transfer source device is in a big-endian format. Moreover, a transfer bus width is 4 bytes and, in contrast, a read data width is set to be a small value, i.e., 1 byte. A read start address 251 is 0x01 and a read size 271 is 0x05. In this case, in the read start address adjusting circuit 250, the read start address 251 to be received is aligned based on the transfer bus width. Specifically, alignment is performed in the direction in which the read start address 251 is rounded down by 4 bytes and is converted to 0x00. Then, 0x00 is output as an adjusted read start address 252 and is received by the bus interface A220. In the read end address adjusting circuit 270, the read end address 271 to be received is adjusted according to a transfer bus width. Alignment is performed in the direction in which 0x05 is rounded up by the transfer bus width, i.e., 4 and is converted to 0x07. Then, 0x07 is output as the adjusted read end address 272 and is received by the bus interface A220.

The adjusted read start address 252 and the adjusted read end address 272 which have been adjusted in the above-described manner are used as a read transfer command 221 to access the transfer source device and obtain read data 222. In this processing, unnecessary read data such as data indicated by addresses 0x00, 0x06 and 0x07 in the data transfer control device are obtained. Such data is to be ignored and not to be used for write transfer.

By adjusting a read start address and a read end address in the above-described manner, even in the case where a read-side device and a write-side device use different endian formats when read burst transfer is performed with a smaller data width than a transfer bus width, data does not have to be divided for single transfers and read data can be obtained by burst transfer.

Next, in the data transfer control device 200, when a read-side device and a write-side device use different endian formats, the operation in which write burst transfer is performed with a smaller data width than a transfer bus width.

In the write start address adjusting circuit 260 and the write end address adjusting circuit 280, adjustment of a write start address and a write size is performed in the same manner as in read burst and adjusted write start address and write size are adjusted to the bus interface B230. A write strobe signal is generated from a write start address and a write end address before adjustment in an appropriate manner. Other than that, the same processing as in the first embodiment is performed.

The write start address and the write size are adjusted in the above-described manner to generate a byte strobe signal. Thus, when write burst transfer is performed with a smaller data width than a transfer bus width, even in the case where the read-side device and the write-side device use different endian formats, data does not have to be divided for single transfers and write data can be written by burst transfer.

Moreover, in the data transfer control device 200, when single transfer is set according to a transfer size even in the case where a transfer data width is smaller than a transfer bus width, the above-described adjustment for start address and size is not performed. Details about this are as given in the first embodiment.

It has been described that as a unit for alignment of a transfer start address and a transfer end address, a transfer bus width is used. However, the alignment unit is not limited to a transfer bus width. For example, when a transfer bus width and a data unit for endian conversion are different and, specifically, the transfer bus width is 8 bytes and the data unit is 4 bytes, alignment can be performed in a unit of 4 bytes.

In the operation examples according to this embodiment, setting for a transfer register in the data transfer control device is performed in a little-endian format. However, transfer register setting is not limited to a little-endian format, but a transfer register can be set in a big-endian format or some other endian format.

Third Embodiment

Figure 7:
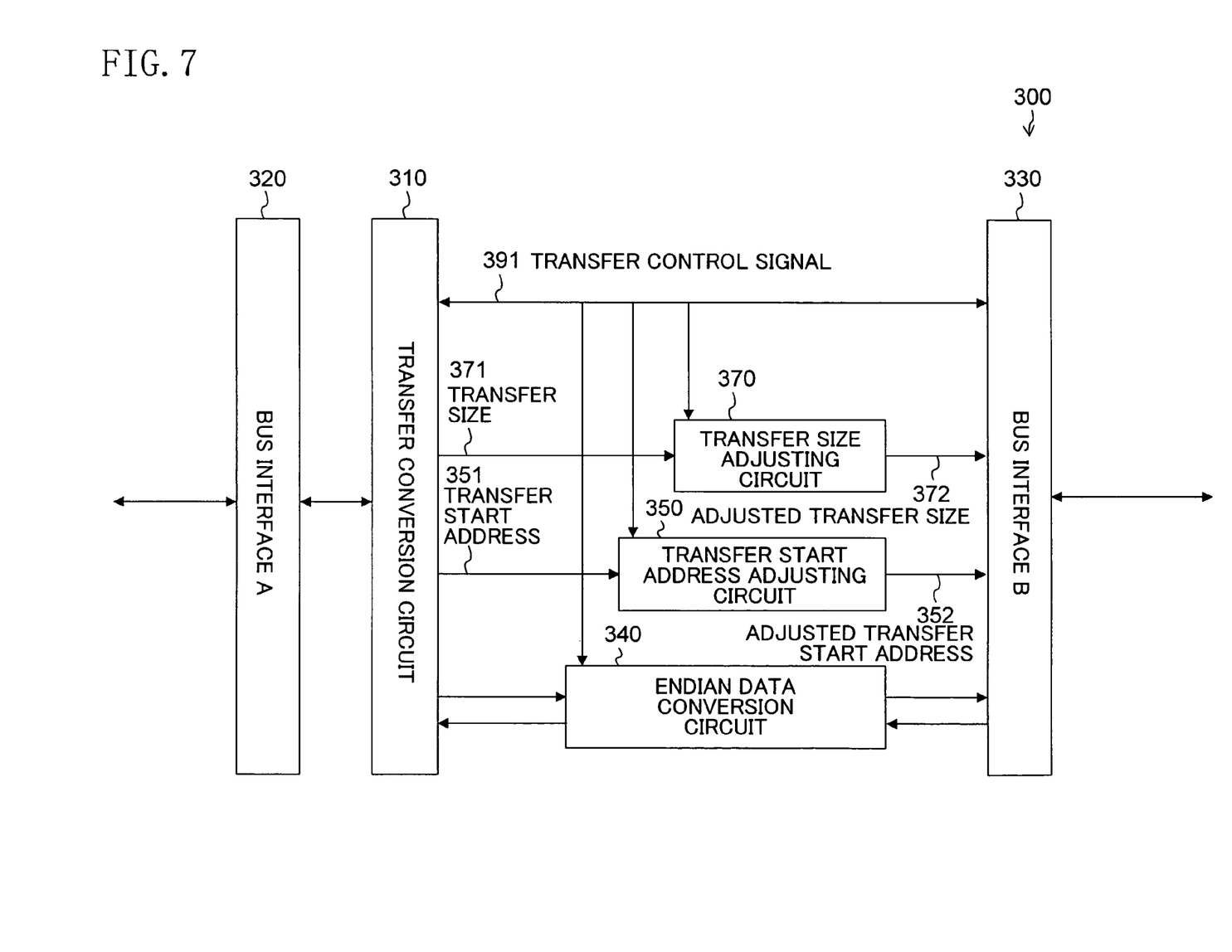
FIG. 7 is a block diagram illustrating a configuration of a bus adapter according to a third embodiment of the present invention.

FIG. 7 is a block diagram illustrating a configuration of a bus adapter 300 according to a third embodiment of the present invention. In the bus adapter 300 of this embodiment, a master for issuing a transfer control signal or a bus to which a master is connected is connected to a bus interface A320 and a slave or a bus to which a slave is connected is connected to a bus interface B330.

The bus adapter 300 includes the bus interface A320, the bus interface B330, a transfer conversion circuit 310 for making transfer command and transfer data from the bus interface A320 meet a bus standard of the slave, a transfer control signal 391 output from the transfer conversion circuit 310 to the bus interface B330 and an endian data conversion circuit 340 for receiving read data from the slave or write data from the master and adjusting a byte location according to endian information of the master and the slave included in the transfer control signal 391, a transfer start address adjusting circuit 350 for receiving a transfer start address 351, adjusting the transfer start address 351 according to a value of the transfer control signal 391 and outputting an adjusted transfer start address 352, and a transfer size adjusting circuit 370 for receiving a transfer size 371, adjusting the transfer size 371 according to the value of the transfer control signal 391 and outputting an adjusted transfer size 372. Each of the above-described outputs is received by the bus interface B330.

Next, in the bus adapter 300, an operation when burst transfer is performed with a smaller data width than a transfer bus width in the case where a master and a slave are in different endian formats is described using a specific example.

Figure 8:
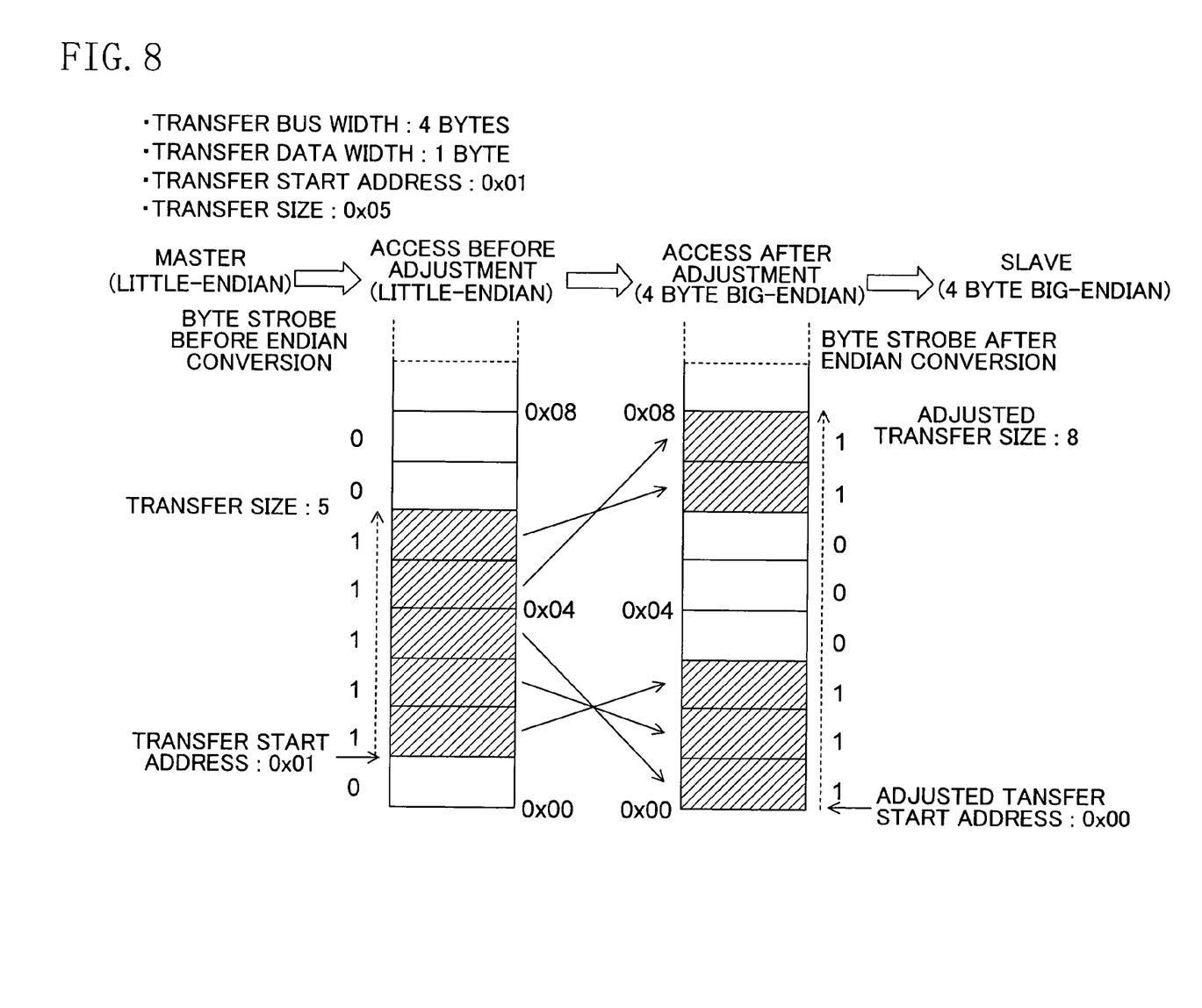
FIG. 8 is a diagram illustrating an exemplary transfer operation according to the third embodiment of the present invention when transfer to a slave in a different endian format is performed with a smaller data width than a transfer bus width.

In an example shown in FIG. 8, a master is operated in a little-endian format and a slave is operated in a big-endian format. Moreover, a transfer bus width is 4 bytes and, in contrast, a read data width is set to be a small value, i.e., 1 byte. The transfer start address 351 is 0x01 and the transfer size 371 is 0x05. In this case, in the transfer start address adjusting circuit 350, the transfer start address 351 to be received is aligned based on the transfer bus width. Specifically, alignment is performed in the direction in which the transfer start address 351 is rounded down by 4 bytes and is converted to 0x00. Then, 0x00 is output as the adjusted transfer start address 352 and is received by bus interface B330.

In the transfer size adjusting circuit 370, the transfer size 371 to be received is adjusted according to a transfer bus width and a transfer start address. First, an access amount of increase by alignment of the read start address 351 is calculated. In this case, as for an amount of access to 0x00, 1 is added and 6 is obtained. Next, alignment is performed in the direction in which 6 is rounded up by the transfer bus width, i.e., 4 and is converted into 8. Then, 8 is output as an adjusted read size 372 and is received by the bus interface B330.

In this transfer, access to unnecessary transfer data such as data indicated by addresses 0x00, 0x06 and 0x07 in the master is achieved. In read transfer, such data is to be ignored. In write transfer, such data is controlled by a write strobe signal in the following manner. Specifically, in write transfer, an effective byte of write data can be determined from the transfer start address 351 and the transfer size 371 and thus its byte strobe signal is set to be 1. Thereafter, in the endian data conversion circuit 340, endian conversion is performed to the byte strobe signal in the same manner as to the write data. The write data and the byte strobe signal output from the endian data conversion circuit 340 are output to the slave via the bus interface B330. In this example, data in the slave is accessed by 8 burst transfers from the address 0x00 to the address 0x07 such that 1 byte is transferred per burst transfer.

The transfer start address and the transfer size are adjusted in the above-described manner. Thus, when burst transfer is performed with a smaller data width than a transfer bus width, even in the case where the read-side device and the write-side device use different endian formats, data does not have to be divided for single transfers and access to the data can be achieved by burst transfer.

Moreover, in the bus adapter 300, when single transfer is set according to the transfer size 371, even with a smaller transfer data width than a transfer bus width, the above-described adjustment for start address and size is not performed. Details about this are as given in the first embodiment.

In the bus adapter 300, access location is adjusted on the assumption that a slave can specify an access location according to a transfer start address and a transfer size. Even if transfer is performed to a different standard slave such as a slave which can specify an access location according to a transfer start address and a transfer end address, the present invention can be used in the same manner.

It has been described that as a unit for alignment of a transfer start address and a transfer size, a transfer bus width is used. However, the alignment unit is not limited to a transfer bus width. For example, when a transfer bus width and a data unit for endian conversion are different and, specifically, the transfer bus width is 8 bytes and the data unit is 4 bytes, alignment can be performed in a unit of 4 bytes.

In the operation examples according to this embodiment, setting for a transfer register in the bus adapter is performed in a little-endian format. However, transfer register setting is not limited to a little-endian format, but a transfer register can be set in a big-endian format or some other endian format.

Fourth Embodiment

Figure 9:
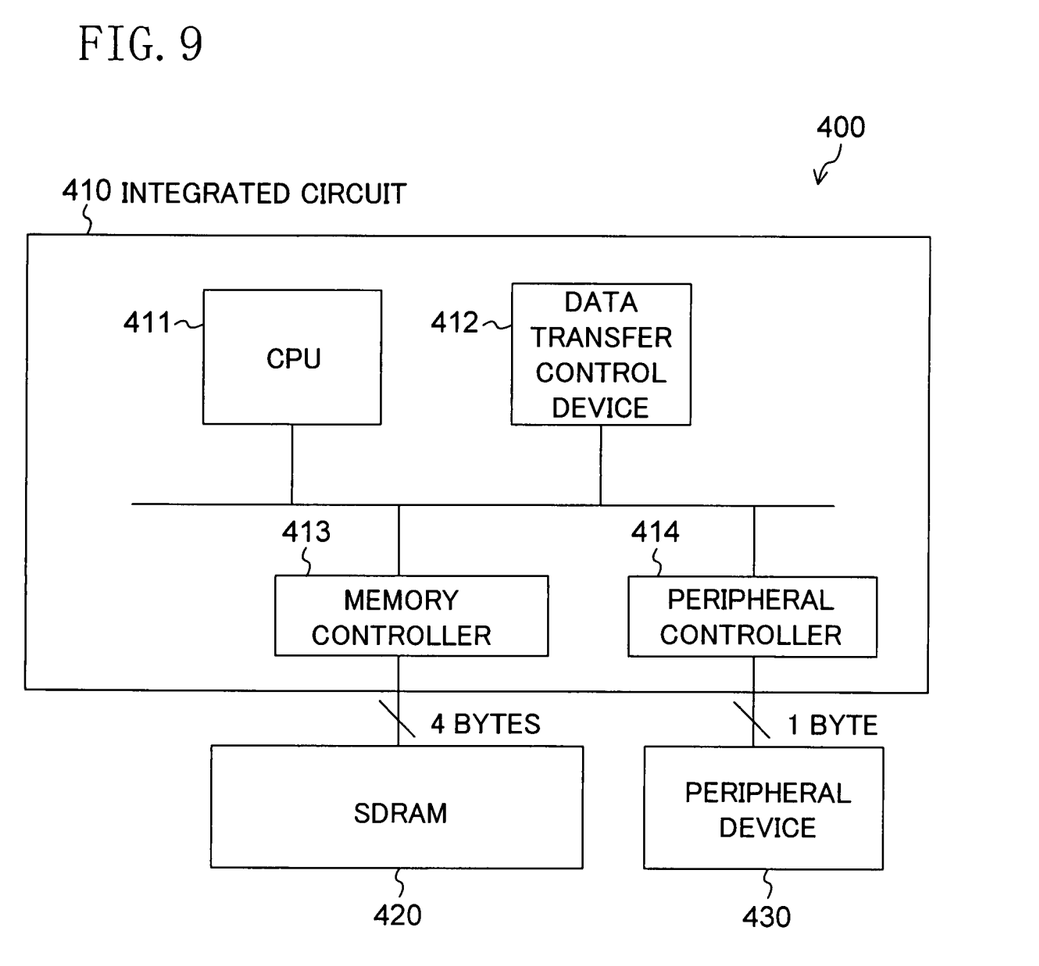
FIG. 9 is a block diagram illustrating a configuration of a system according to a fourth embodiment of the present invention.

FIG. 9 is a block diagram illustrating a configuration of a system 400 according to a fourth embodiment of the present invention. The system 400 includes an integrated circuit 410, an SDRAM 420 and a peripheral device 430. The integrated circuit 410 includes a CPU 411, a data transfer control device 412, a memory controller 413 and a peripheral controller 414. These components are interconnected with one another through a bus. The memory controller 413 is connected to the SDRAM 420 and the peripheral controller 414 is connected to the peripheral device 430. The data transfer control device 412 has the function of adjusting an access destination according to the present invention, which has been described in the first and second embodiment.

The case where in the system 400, data is transferred in a burst manner from the peripheral device 430 to the SDRAM 420 using the data transfer control device 412 is now considered. In this case, the peripheral device 430 is in a little-endian format and data is stored in the SDRAM 420 in a 4 byte big-endian format. A setting register of the data transfer control device 412 is set in a little-endian format. A transfer data width is 1 byte in each of a transfer source and a transfer destination.

First, a read instruction is issued from the data transfer control device 412 to the peripheral device 430. When read data from the peripheral device 430 is sent to the data transfer control device 412, a write instruction to the SDRAM 420 is issued. In this write instruction issuance, a data width is 1 byte and a different endian type is used. Therefore, by the function of adjusting an access destination according to the present invention, which has been described in the first and second embodiments, an address and the like are adjusted and an adjusted address and the like are issued. According to this adjustment, in contrast to ordinary cases where a plurality of single write instructions are issued according to different endian types, a burst write instruction can be issued and reduction in access performance is prevented. Also in the case where data is transferred from the SDRAM 420 to the peripheral device 430, the same effect can be achieved. Thus, when it is intended to access a large access latency external memory device, the present invention is effectively used.

Moreover, the present invention is effective not only to an external memory device such as an SDRAM but also to a large latency peripheral device. It is apparent that the present invention is not limited to an external memory device. As an example, the case where in the system 400, data is transferred in a burst manner from the SDRAM 420 to the peripheral device 430 using the data transfer control device 412 is hereafter considered. In this case, it is assumed that the SDRAM 420 is in a little-endian format, a data width thereof is 4 bytes, the peripheral device 430 is in a big-endian format and a data width thereof is 1 byte. Also, a setting register of the data transfer control device 412 is assumed to be set in a little-endian format. When a read instruction is issued from the data transfer control device 412 to the SDRAM 420 and read data from the SDRAM 420 is sent to the data transfer control device 412, a write instruction to the peripheral device 430 is issued. In this case, a write instruction to the peripheral device 430 is issued after an address and the like have been adjusted by the function of adjusting an access destination according to the present invention, which has described in the first and second embodiments. Thus, in contrast to ordinary cases where a plurality of single write instructions are issued according to different endian types, a burst write instruction can be issued, so that reduction in access performance is prevented. Also in the case where data is transferred from the peripheral device 430 to the SDRAM 420, the same effect can be achieved. Thus, the present invention is effective not only in access to an external memory device such as an SDRAM but also in access to a large latency peripheral device. It is apparent that the present invention is not limited to an external memory device. Also, the present invention is effective in access not to external equipment located outside of the integrated circuit 410 but to a large latency internal function block.

In the operation examples according to this embodiment, setting for a transfer register in the data transfer control device is performed in a little-endian format. However, transfer register setting is not limited to a little-endian format, but transfer register can be set in a big-endian format or some other endian format.

Even in an integrated circuit in which the bus adapter of the third embodiment is mounted, reduction in access performance can be prevented in the same manner. Thus, it is apparent that the present invention is not limited to the above-described configuration.

A data transfer control device according to the present invention can perform burst transfer without dividing data for single transfers even when burst transfer to an access destination in a different endian format is performed with a smaller data width than a transfer bus width. Thus, access corresponding to endian conversion can be performed without reducing access performance. Specifically, in a device such as an SDRAM having a relatively large access latency, large reduction in access performance can be prevented and the present invention is particularly effective.

A data transfer control device according to the present invention can be largely used in circuits relating to data transfer, such as a DMA transfer control circuit, a bus adapter, a bus adapter having a DMA transfer control function and the like.

What is claimed is:

1. A data transfer control device which includes an endian conversion circuit, the device further comprising:
    a transfer start address adjusting circuit;
    a write strobe signal generation circuit for generating a write strobe signal for indicating an effective byte of write data; and
    a bus interface,
    wherein the endian conversion circuit endian-converts the write data to which the write strobe signal generated in the write strobe signal generation circuit has been added, and outputs the result to the bus interface;
    when data is transferred to a device in a different endian format with a smaller data width than a transfer bus width, the transfer start address adjusting circuit aligns a transfer start address with the transfer bus width and outputs the result to the bus interface; and
    the bus interface burst-transfers with a smaller data width than the transfer bus width, the write data to which the write strobe signal output from the endian conversion circuit has been added, based on the transfer start address output from the transfer start address adjusting circuit.

2. The data transfer control device of claim 1, further comprising a transfer size adjusting circuit,
    wherein when data is transferred to a device in a different endian format, a transfer size is adjusted according to the transfer bus width and the transfer start address in the transfer size adjusting circuit.

3. The data transfer control device of claim 2, wherein in single transfer, adjustment of the transfer start address and adjustment of the transfer size are not performed.

4. The data transfer control device of claim 1, further comprising a transfer end address adjusting circuit,
    wherein when data is transferred to a device in a different endian format, a transfer end address is aligned based on the transfer bus width in the transfer end address adjusting circuit.

5. The data transfer control device of claim 4, wherein in single transfer, adjustment of the transfer start address and adjustment of the transfer end address are not performed.

6. A system comprising:
    an integrated circuit including the data transfer control device of claim 1; and
    an external memory device,
    wherein the external memory device is used as a transfer source or a transfer destination of the data transfer control device.

* * * * *